(12) United States Patent
Shouji et al.

(10) Patent No.: US 10,227,675 B2
(45) Date of Patent: Mar. 12, 2019

(54) WET SMELTING METHOD FOR NICKEL OXIDE ORE

(71) Applicant: SUMITOMO METAL MINING CO., LTD., Tokyo (JP)

(72) Inventors: Hirofumi Shouji, Niihama (JP); Keiji Kudo, Niihama (JP); Yoshitomo Ozaki, Niihama (JP); Hiroshi Kobayashi, Niihama (JP); Satoshi Asano, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 0 days.

(21) Appl. No.: 15/552,307

(22) PCT Filed: Dec. 8, 2015

(86) PCT No.: PCT/JP2015/084417
§ 371 (c)(1),
(2) Date: Aug. 21, 2017

(87) PCT Pub. No.: WO2016/136087
PCT Pub. Date: Sep. 1, 2016

(65) Prior Publication Data
US 2018/0037972 A1 Feb. 8, 2018

(30) Foreign Application Priority Data

Feb. 24, 2015 (JP) .................................. 2015-033940

(51) Int. Cl.
| C22B 1/00 | (2006.01) |
| C22B 3/08 | (2006.01) |
| C22B 3/00 | (2006.01) |
| C22B 23/00 | (2006.01) |

(52) U.S. Cl.
CPC .................. C22B 1/00 (2013.01); C22B 3/08 (2013.01); C22B 23/005 (2013.01); C22B 23/043 (2013.01); *Y02P 10/212* (2015.11)

(58) Field of Classification Search
CPC ....... C22B 1/00; C22B 23/005; C22B 23/043; C22B 3/08; Y02P 10/212
See application file for complete search history.

(56) References Cited

U.S. PATENT DOCUMENTS

| 4,548,794 | A | 10/1985 | Lowenhaupt et al. |
| 7,563,421 | B2 | 7/2009 | Kobayashi et al. |
| 2002/0041840 | A1 | 4/2002 | Arroyo et al. |
| 2005/0226797 | A1 | 10/2005 | Liu et al. |
| 2005/0265910 | A1 | 12/2005 | Kobayashi et al. |
| 2008/0053276 | A1 | 3/2008 | Liu et al. |

FOREIGN PATENT DOCUMENTS

| CN | 103352120 A | 10/2013 |
| EP | 0547744 A1 | 6/1993 |
| JP | 60-075536 A | 4/1985 |
| JP | 06-116660 A | 4/1994 |
| JP | 2003-514109 A | 4/2003 |
| JP | 2005-523996 A | 8/2005 |
| JP | 2005-350766 A | 12/2005 |
| JP | 2007-077459 A | 3/2007 |
| JP | 2008-530356 A | 8/2008 |
| WO | 01/32944 A1 | 5/2001 |
| WO | 2006/084335 A1 | 8/2006 |
| WO | 2010/020245 A1 | 2/2010 |
| WO | 2010/060144 A1 | 6/2010 |

OTHER PUBLICATIONS

International Search Report dated Mar. 15, 2016, issued for PCT/JP2015/084417.
Extended European Search Report dated Dec. 19, 2017, issued to EP Patent Application No. 15883377.2.
Office Action dated Jan. 24, 2018, issued to CN Patent Application No. 201580076721.3.

*Primary Examiner* — Jenny R Wu
(74) *Attorney, Agent, or Firm* — Locke Lord LLP

(57) ABSTRACT

A wet smelting method for nickel oxide ores from which nickel, cobalt, etc. are recovered is provided with which it is possible to reduce the consumption of an acid in leaching, such as sulfuric acid, and to recover valuable metals. The method comprises: step (A) in which nickel oxide ores as a raw material are separated into a limonite-type ore having a low magnesium content and a saprolite-type ore having a high magnesium content; step (B) in which the saprolite-type ore is subjected to normal-pressure leaching under given standardized leaching conditions using the pressure leachate obtained by pressure leaching in step (C); and step (C) in which the limonite-type ore obtained in step (A) is mixed with the normal-pressure leaching residue obtained in step (B) and the mixture is reacted with sulfuric acid in an acidic atmosphere having a high temperature and a high pressure, thereby conducting pressure leaching.

1 Claim, 8 Drawing Sheets

WET SMELTING METHOD FOR NICKEL OXIDE ORE

TECHNICAL FIELD

The present invention relates to a wet smelting method for nickel oxide ore, and more particularly to a method capable of recovering valuable metals from a saprolite-type ore, which contains a large amount of alkali metals such as magnesium and silica, of a nickel oxide ore by wet smelting with high efficiency.

BACKGROUND ART

As a method for recovering valuable metals such as nickel and cobalt from a low grade nickel oxide ore having a low nickel grade by wet smelting, for example, as described in Patent Document 1, a high pressure acid leaching method (HPAL method) has been performed in which sulfuric acid is added to an ore slurry, followed by leaching under high temperature and high pressure.

Herein, in a low grade nickel oxide ore, there are two kinds of ore: a limonite-type ore having a high iron grade and a low alkaline component grade such as magnesium and silica and a saprolite-type ore containing a large amount of alkaline component, and the limonite-type ore has been mainly used as a raw material for the HPAL method.

On the other hand, in the case of using the saprolite-type ore as raw material, sulfuric acid added in a leaching treatment and an alkaline component contained in the ore react with each other to form an alkali sulfate such as magnesium sulfate, and as a result, the consumed amount of acid tends to increase, which is economically disadvantageous. For this reason, a case where the saprolite-type ore is subjected to pressure leaching based on the HPAL method is limited only to some amounts in which the balance between the recovered amount of valuable metals and the consumed amount of sulfuric acid is achieved; however, in many cases, the amount thereof stays at only a small ore amount of the saprolite-type ore to be produced.

Hitherto, for example, normal-pressure leaching methods have been studied as a method for effectively using a saprolite-type ore. Specifically, the methods are to use a saprolite-type ore as a neutralizer for a free acid contained in a leachate to be obtained by the HPAL method, and for example, are disclosed in Patent Documents 2, 3, and the like. However, the main objects of these methods are merely to utilize the saprolite-type ore as a neutralizer for a free acid or a magnesium source, and in the case of the use of the saprolite-type ore as a neutralizer, the recovery rate of valuable metals such as nickel and cobalt contained in the saprolite-type ore is low. Thus, it is difficult to say that the saprolite-type ore is effectively utilized as raw material.

Further, in a method disclosed in Patent Document 4, there is disclosed a method of leaching nickel and cobalt through normal-pressure leaching by using a saprolite-type ore as raw material. Although a high recovery rate can be achieved, the time necessary for the normal-pressure leaching is 9.5 hours or longer, which is extremely long and thus this method has poor productivity efficiency.

In this regard, Patent Document 5 proposes a method for recovering valuable metals by supplying a leaching residue obtained by normal-pressure leaching to an HPAL pressure leaching treatment. Specifically, the method disclosed in Patent Document 5 is to treat the entire amount of a low grade nickel oxide ore by normal-pressure leaching and pressure leaching. However, at a reaction temperature of 95° C., which is the condition for the normal-pressure leaching, there are a further need for a retention time of 2 hours to 3 hours in a reaction tank, a need for expanding the scale of equipment, supplying a large amount of heat for heating and warming, and the like. Thus, the method is not efficient in terms of actual operations.

Furthermore, since the main object of normal-pressure leaching of Patent Document 5 is also to neutralize the free acid in the leachate to be obtained by pressure leaching, the magnesium leaching rate in the normal-pressure leaching is merely about 42% to 50%, and thus the amount of sulfuric acid consumed by magnesium in the pressure leaching is still large.

Further, there is a problem in that the leaching rate of valuable metals such as nickel and cobalt decreases as the concentration of magnesium contained in the pressure leachate increases. For this reason, there is a problem in that the saprolite-type ore cannot be effectively utilized as raw material, for example, some of the normal-pressure leaching residue is discharged to a system, a saprolite-type ore having a magnesium grade of a certain degree or more cannot be used for the normal-pressure leaching, and the like.

In the aforementioned Patent Document 5, as a countermeasure therefor, recycling of the solution discharged from the process which contains sodium is proposed. Specifically, the solution discharged from the process which contains sodium is used for a multistage rinsing liquid for a pressure leaching residue, a diluted solution of a flocculant that is added at the time of solid-liquid separation in a thickener or the like, generation of a low grade nickel oxide ore slurry, and the like so as to remove iron and aluminum, which are impurity components at the time of the pressure leaching, as natrojarosite and natroalunite respectively, and thus the amount of sulfuric acid consumed by these impurity components is intended to be reduced. However, there is a concern that double sulfates such as natrojarosite and natroalunite become scale in an autoclave. Further, the solution discharged from the process which contains sodium is a magnesium sulfate solution obtained after recovering the valuable metals and magnesium sulfate is condensed by circulation in the process system. For this reason, crystal precipitation may occur in the process beyond the saturation concentration, and there is also a concern that filtration failures, pipe blockages, and the like occur.

Due to the reasons described above, in the HPAL method, the saprolite-type ore has not yet been effectively used as raw material, and thus there is a demand for a method capable of efficiently recovering valuable metals such as nickel and cobalt from the saprolite-type ore.

Patent Document 1: Japanese Unexamined Patent Application, Publication No. 2005-350766

Patent Document 2: Japanese Unexamined Patent Application, Publication No. S60-75536

Patent Document 3: Japanese Unexamined Patent Application, Publication No. 2007-77459

Patent Document 4: Japanese Unexamined Patent Application (Translation of PCT Application), Publication No. 2008-530356

Patent Document 5: Japanese Unexamined Patent Application, Publication No. H06-116660

DISCLOSURE OF THE INVENTION

Problems to be Solved by the Invention

The present invention is proposed in view of the circumstances as described above, and an object thereof is to provide a wet smelting method for nickel oxide ore by which nickel, cobalt, and the like are recovered from the nickel oxide ore, the method being capable of reducing the consumed amount of acid such as sulfuric acid which is used in a leaching treatment and recovering valuable metals such as nickel and cobalt with high efficiency.

Means for Solving the Problems

The present inventors have conducted intensive studies to solve the aforementioned problems. As a result, the present inventors have found that when normal-pressure leaching is carried out only using a saprolite-type ore containing a large amount of alkaline component such as magnesium or silica of a nickel oxide ore serving as raw material under a predetermined standardized leaching condition to leach magnesium to a target magnesium grade and then pressure leaching is carried out on the leaching residue obtained by the normal-pressure leaching and on a limonite ore with a lower alkaline component, the amount of sulfuric acid consumed in the pressure leaching treatment can be effectively reduced and valuable metals such as nickel and cobalt can be recovered with high efficiency. Thus, the present invention has been completed. That is, the present invention provides the following.

That is, the present invention is a wet smelting method for nickel oxide ore by which valuable metals such as nickel and cobalt are recovered from the nickel oxide ore, the method including: a step (A) of separating the nickel oxide ore into a limonite-type ore having a low magnesium grade with a magnesium grade of 2% by weight or less and a saprolite-type ore having a high magnesium grade with a magnesium grade of more than 2% by weight; a step (B) of normal-pressure leaching the saprolite-type ore obtained in the step (A) by adding a pressure leachate which is obtained by pressure leaching in a step (C) described below and in which the concentration of sulfuric acid is adjusted such that the value, which is obtained by dividing the total value of the concentration of free acid contained in the pressure leachate and the concentration of iron ions calculated on the assumption that the existence form is trivalent by the grade of magnesium contained in the saprolite-type ore, becomes 1.5 mol/mol equivalent or less, to obtain a normal-pressure leachate and a normal-pressure leaching residue; and a step (C) of performing pressure leaching by mixing the limonite-type ore obtained in the step (A) and the normal-pressure leaching residue obtained in the step (B) and then reacting the resultant mixture with sulfuric acid in an acidic atmosphere under high temperature and high pressure, to obtain a pressure leachate.

Effects of the Invention

According to the present invention, in the wet smelting method for nickel oxide ore by which valuable metals such as nickel and cobalt are recovered from the nickel oxide ore, the consumed amount of acid such as sulfuric acid which is used in the pressure leaching treatment can be effectively reduced and valuable metals such as nickel and cobalt can be recovered with high efficiency.

PREFERRED MODE FOR CARRYING OUT THE INVENTION

Figure 1:
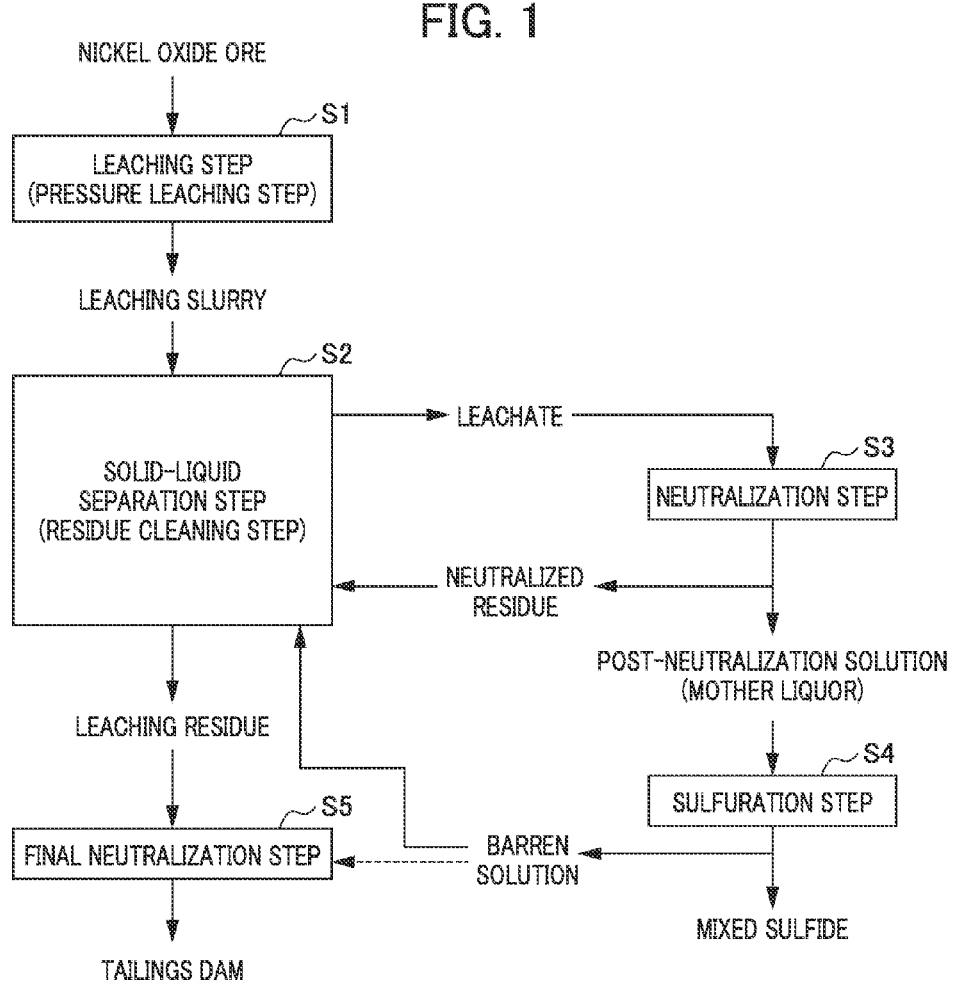
FIG. 1 is a process diagram illustrating the flow of the wet smelting method for nickel oxide ore.

Hereinafter, a specific embodiment of the present invention (hereinafter, referred to as "the present embodiment") will be described in detail with reference to the drawings. Incidentally, the present invention is not limited to the following embodiment, and various modifications can be made within the range that does not change the spirit of the present invention.

<<1. Outline>>

The wet smelting method for nickel oxide ore according to the present embodiment is a method for recovering valuable metals such as nickel and cobalt by subjecting a low grade nickel oxide ore having a low nickel grade to a leaching treatment. Specifically, the wet smelting method for nickel oxide ore according to the present invention is a method for recovering valuable metals such as nickel and cobalt from a low grade nickel oxide ore with high efficiency by normal-pressure leaching a saprolite-type ore containing a large amount of magnesium, silica, or the like of a low grade nickel oxide ore and then performing pressure leaching to effectively reduce the used amount of sulfuric acid consumed in the pressure leaching.

More specifically, the wet smelting method for nickel oxide ore according to the present embodiment includes the following step (A) to step (C). Step (A): an ore separation step of separating the nickel oxide ore serving as the raw material into a limonite-type ore having a low magnesium grade with a magnesium grade of 2% by weight or less and a saprolite-type ore having a high magnesium grade with a magnesium grade of more than 2% by weight. Step (B): a normal-pressure leaching step of normal-pressure leaching the saprolite-type ore obtained in step (A) by adding a pressure leachate which is obtained by pressure leaching in step (C) described below and in which the concentration of sulfuric acid is adjusted such that the value, which is obtained by dividing the total value of the concentration of the free acid contained in the pressure leachate and the concentration of iron ions calculated on the assumption that the existence form is trivalent by the grade of magnesium contained in the saprolite-type ore, becomes 1.5 mol/mol equivalent or less, to obtain a normal-pressure leachate and a normal-pressure leaching residue. Step (C): a pressure leaching step of performing pressure leaching by mixing the limonite-type ore obtained in step (A) and the normal-pressure leaching residue obtained in step (B) and then reacting the resultant mixture with sulfuric acid in an acidic atmosphere under high temperature and high pressure to obtain a pressure leachate.

In the wet smelting method according to the present embodiment, the nickel oxide ore serving as raw material is separated into a limonite ore and a saprolite ore on the basis of the magnesium grade, and the normal-pressure leaching treatment using the pressure leachate is carried out only on the separated saprolite ore. The normal-pressure leaching treatment is carried out on the quantity standardized by the molar ratio of the amount of acid contained in the pressure leachate to the amount of magnesium contained in the saprolite ore as the target of the normal-pressure leaching treatment, and the magnesium grade of the normal-pressure leaching residue is decreased to the target magnesium grade. Then, subsequently, the limonite-type ore obtained by separation and the normal-pressure leaching residue obtained by the normal-pressure leaching treatment are mixed with each other and then the pressure leaching is performed under high temperature and high pressure by adding sulfuric acid.

According to such a method, the amount of the low grade nickel oxide ore provided to the normal-pressure leaching can be reduced, and the leaching of magnesium in the saprolite-type ore can be promoted by the normal-pressure leaching. As a result, the amount of sulfuric acid used in the pressure leaching can be effectively reduced. According to this, even in the case of a low acid concentration, the valuable metals, such as nickel and cobalt, contained in the nickel oxide ore can be leached by the pressure leaching at a high leaching rate, and the valuable metals can be recovered from the low grade nickel oxide ore with high efficiency.

Further, the amount of acid contained in the pressure leachate used in the normal-pressure leaching is appropriately adjusted by additionally adding sulfuric acid so that the magnesium grade of the normal-pressure leaching residue can be efficiently reduced to a target magnesium grade in a further shorter time. Thus, the scale of the equipment necessary for the normal-pressure leaching treatment can be reduced.

Hereinafter, the wet smelting method for recovering valuable metals from the low grade nickel oxide ore will be described in more detail, but first, the wet smelting method for nickel oxide ore to which the wet smelting method for recovering valuable metals can be applied will be described. Incidentally, regarding the wet smelting method for nickel oxide ore to be described below, an embodiment in which nickel and cobalt are recovered by a high temperature pressure acid leaching method (HPAL method) using a sulfuric acid solution is described as a specific example.

<<2. Wet Smelting Method for Nickel Oxide Ore Based on HPAL Method>>

FIG. 1 is a process diagram illustrating the flow of the wet smelting method for nickel oxide ore using an HPAL method. As illustrated in the process diagram of FIG. 1, the wet smelting method for nickel oxide ore includes: a leaching step S1 of performing leaching (pressure leaching) under high temperature and high pressure by adding a sulfuric acid solution to nickel oxide ore slurry; a solid-liquid separation step S2 of separating the leaching residue while washing the leached slurry obtained by the leaching treatment in multiple stages to obtain a leachate containing nickel, cobalt, and impurity elements; a neutralization step S3 of neutralizing the surplus acid in the leachate by adjusting the pH of the leachate and separating and removing the neutralized precipitate (neutralized residue) containing impurity elements to obtain a post-neutralization solution containing nickel and cobalt; a sulfuration step S4 of performing a sulfuration treatment by adding a sulfurizing agent to the post-neutralization solution to generate a mixed sulfide containing nickel and cobalt; and a final neutralization step S5 of neutralizing the leaching residue slurry separated from the solid-liquid separation step S2 and the metallic impurities contained in the barren solution discharged from the sulfuration step S4 to be removed and discharged.

(1) Leaching Step

In the leaching step S1, using a pressurized reaction tank such as a high temperature pressurizing container (an autoclave), a sulfuric acid solution is added to a low grade nickel oxide ore slurry (ore slurry) and then pressure leaching is carried out by stirring the ore slurry while being pressurized under a high temperature condition of 220° C. to 280° C., thereby generating a leached slurry composed of a leachate and a leaching residue.

As the nickel oxide ore, mainly, a so-called laterite ore such as a limonite ore having a high Fe grade and a low alkaline component grade or a saprolite ore containing a large amount of alkaline component such as magnesium or silica is exemplified. The content of nickel in the laterite ore is typically 0.8% by weight to 2.5% by weight and nickel is contained as a hydroxide or silica-magnesia (magnesium silicate) mineral. Further, the content of iron in the laterite ore is 10% by weight to 50% by weight and iron is mainly in the form of trivalent hydroxide (goethite); however, some divalent iron is contained in the silicate-magnesia mineral.

Further, in this leaching step S1, in addition to the laterite ore as described above, an oxide ore containing valuable metals such as nickel, cobalt, manganese, and copper, for example, a manganese nodule existing at the bottom of the deep part of the sea can also be treated.

In the pressure leaching treatment in the leaching step S1, a leaching reaction represented by the following formulae (i) to (iii) and a high temperature thermal hydrolysis reaction represented by the following formulae (iv) and (v) occur so that leaching of nickel, cobalt, and the like as sulfates and fixation of the leached iron sulfate as hematite are performed.

Leaching Reaction $$MO + H_2SO_4 \Rightarrow MSO_4 + H_2O \qquad (i)$$

(incidentally, M in the formula represents Ni, Co, Fe, Zn, Cu, Mg, Cr, Mn, or the like)

$$2Fe(OH)_3 + 3H_2SO_4 \Rightarrow Fe_2(SO_4)_3 + 6H_2O \qquad (ii)$$

$$FeO + H_2SO_4 \Rightarrow FeSO_4 + H_2O \qquad (iii)$$

High Temperature Thermal Hydrolysis Reaction $$2FeSO_4 + H_2SO_4 + \tfrac{1}{2}O_2 \Rightarrow Fe_2(SO_4)_3 + H_2O \qquad (iv)$$

$$Fe_2(SO_4)_3 + 3H_2O \Rightarrow Fe_2O_3 + 3H_2SO_4 \qquad (v)$$

(2) Solid-Liquid Separation Step (Leaching Residue Cleaning Step)

In the solid-liquid separation step S2, the leached slurry formed in the pressure leaching treatment in the leaching step S1 is washed in multiple stages to perform solid-liquid separation into a leachate containing nickel and cobalt and a leaching residue. In this solid-liquid separation step S2, in order to promote the sedimentation and separation of the leaching residue, for example, the solid-liquid separation treatment can be performed by adding an anionic flocculant or the like.

In the solid-liquid separation step S2, for example, the leached slurry is mixed with a rinsing liquid and then subjected to the solid-liquid separation treatment by a solid-liquid separation facility such as a thickener. Specifically, first, the leached slurry is diluted with the rinsing liquid, and then the leaching residue in the slurry is condensed as a precipitate in the thickener. According to this, the remaining nickel adhered to the leaching residue can be decreased depending on the degree of dilution. Incidentally, the solid-liquid separation step S2 is also referred to as a leaching residue cleaning step.

In the solid-liquid separation step S2, it is preferable that the solid-liquid separation be carried out while the leached slurry is washed in multiple stages. As a multiple washing method, for example, a continuous countercurrent multi-stage washing method in which the leached slurry is brought into countercurrent contact with a rinsing liquid can be used. According to this, the amount of rinsing liquid to be newly introduced into the system can be reduced and the recovery rate of nickel and cobalt can be increased to 95% or more. In addition, the rinsing liquid (rinsing water) is not particularly limited, but it is preferable to use a liquid which contains no nickel and has no effect on the step. For example, as the rinsing liquid, preferably, the barren solution obtained in the sulfuration step S4 of the subsequent steps can be repeatedly used.

(3) Neutralization Step

In the neutralization step S3, the pH of the leachate separated in the solid-liquid separation step S2 is adjusted and a neutralized precipitate containing impurity elements is separated to thereby obtain a post-neutralization solution containing nickel and cobalt.

Specifically, in the neutralization step S3, a neutralizer such as calcium carbonate is added to the leachate to neutralize the surplus acid in the leachate while the oxidation of the separated leachate is suppressed such that the pH of the post-neutralization solution obtained is adjusted to 4 or less, preferably 3.0 to 3.5, and more preferably 3.1 to 3.2, and impurity components such as trivalent iron and aluminum in the leachate are obtained as a neutralized precipitate. In the neutralization step S3, the neutralized precipitate generated in this way is subjected to sedimentation and separation to generate a post-neutralization solution serving as a mother liquor for recovering nickel.

Incidentally, in the neutralization step S3, the solid-liquid separation treatment using a solid-liquid separation device such as a thickener is carried out on the slurry (the neutralized slurry) obtained by the neutralization treatment to separate and remove the neutralized precipitate.

(4) Sulfuration Step

In the sulfuration step S4, a sulfurizing agent such as hydrogen sulfide gas is blown into the post-neutralization solution serving as a mother liquor for recovering nickel to cause a sulfuration reaction to occur, thereby obtaining a mixed sulfide containing nickel and cobalt with less impurity components (a nickel•cobalt mixed sulfide) and a barren solution (a post-sulfurization solution) having a stable nickel concentration at a low level.

Incidentally, in this sulfuration step S4, in a case where zinc is contained in the mother liquor for recovering nickel and cobalt (the post-neutralization solution), a treatment to selectively separate zinc as sulfide can be performed before separating nickel and cobalt as sulfide.

In the sulfuration step S4, the slurry of the nickel•cobalt mixed sulfide is subjected to a sedimentation and separation treatment using a solid-liquid separation device such as a thickener to separate and recover the nickel•cobalt sulfide from the bottom of the thickener, and the aqueous solution component is made to overflow and recovered as a post-sulfurization solution.

(5) Final Neutralization Step

In the final neutralization step S5, a neutralization treatment (a detoxification treatment) to adjust the pH to a predetermined pH range satisfying the discharge standard is carried out on the leaching residue slurry discharged from the solid-liquid separation step S2 and the barren solution (the post-sulfurization solution) discharged from the sulfuration step S4.

The detoxification method in the final neutralization step S5, that is, the method for adjusting the pH is not particularly limited, but for example, the pH can be adjusted to a predetermined range by adding a neutralizer such as a calcium carbonate (limestone) slurry or a calcium hydroxide (slaked lime) slurry. According to this neutralization treatment, heavy metal ions contained in the leaching residue slurry or the barren solution are subjected to the neutralization treatment. Incidentally, the final neutralized precipitate slurry in which heavy metal is removed from the aqueous solution is transferred to a tailings dam.

<<3. Wet Smelting Method for Nickel Oxide Ore Including Normal-Pressure Leaching Treatment>>

Herein, in the wet smelting method for nickel oxide ore of the related art described above (FIG. 1), in a case where a magnesium ore having a high magnesium grade such as a saprolite ore is used, for example, as the nickel oxide ore serving as raw material, the sulfuric acid used in the pressure leaching treatment in the leaching step S1 and magnesium that is an alkaline component react with each other to form alkali sulfate so that the effect of the added sulfuric acid is decreased by an interference action of the magnesium and thus the sulfuric acid tends to be excessively consumed (for example, see the following reaction formula).

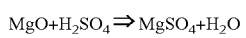

$MgO + H_2SO_4 \Rightarrow MgSO_4 + H_2O$

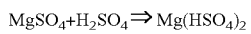

$MgSO_4 + H_2SO_4 \Rightarrow Mg(HSO_4)_2$

By doing so, the amount of sulfuric acid necessary for the pressure leaching treatment is increased and the leaching rate of the valuable metals, such as nickel and cobalt, per a predetermined amount of sulfuric acid is decreased.

On the other hand, the wet smelting method for nickel oxide ore according to the present embodiment is a method in which a normal-pressure leaching treatment step is combined with the aforementioned wet smelting method. Specifically, the nickel oxide ore serving as raw material is separated into a limonite ore and a saprolite ore on the basis of the magnesium grade, and the normal-pressure leaching treatment using the pressure leachate is carried out only on the separated saprolite ore having a high magnesium grade. Then, the normal-pressure leaching treatment is carried out on the quantity standardized by a molar ratio of the amount of acid contained in the pressure leachate with respect to the amount of magnesium contained in the saprolite ore as the target of the normal-pressure leaching treatment, and the magnesium grade of the normal-pressure leaching residue is decreased to a target magnesium grade. Thereafter, the limonite-type ore obtained by separation and the normal-pressure leaching residue obtained by the normal-pressure leaching treatment are mixed with each other and then the pressure leaching is performed under high temperature and high pressure by adding sulfuric acid.

According to such a method, the amount of the nickel oxide ore provided to the normal-pressure leaching can be reduced, and the leaching of magnesium in the saprolite-type ore can be promoted by the normal-pressure leaching. As a result, the amount of sulfuric acid used in the pressure leaching can be effectively reduced. According to this, even in the case of a low acid concentration, the valuable metals, such as nickel and cobalt, contained in the nickel oxide ore can be leached at a high leaching rate, and the valuable metals can be recovered from the nickel oxide ore serving as raw material with high efficiency.

Figure 2:
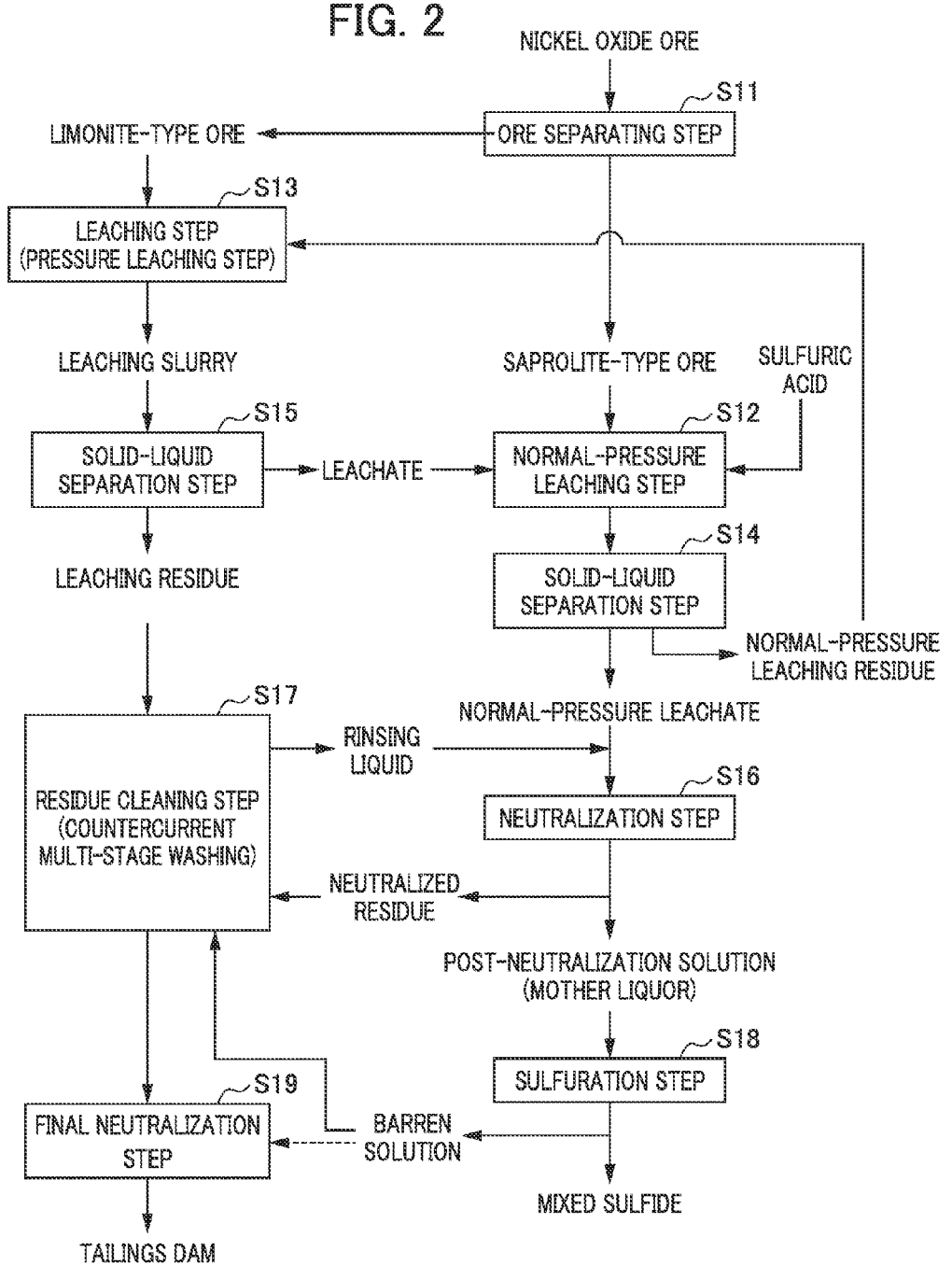
FIG. 2 is a process diagram illustrating the flow of the wet smelting method for nickel oxide ore which is combined with a normal-pressure leaching treatment carried out only on a saprolite ore.

FIG. 2 is a process diagram illustrating the flow of the wet smelting method for nickel oxide ore according to the present embodiment. As illustrated in the process diagram of FIG. 2, the wet smelting method for nickel oxide ore according to the present embodiment includes: an ore separation step S11 of separating the nickel oxide ore serving as raw material into a limonite-type ore having a low magnesium grade and a saprolite-type ore having a high magnesium grade; a normal-pressure leaching step S12 of normal-pressure leaching the saprolite-type ore separated in the ore separation step S11 by adding a pressure leachate which is obtained by a pressure leaching step S13 and in which the concentration of sulfuric acid is adjusted such that the value, which is obtained by dividing the total value of the concentration of the free acid contained in the pressure leachate and the concentration of iron ions calculated on the assumption that the existence form is trivalent by the grade of magnesium contained in the saprolite-type ore, becomes a predetermined equivalent or less; and a pressure leaching step S13 of performing pressure leaching by mixing the limonite-type ore separated in the ore separation step S11 and the normal-pressure leaching residue obtained in the normal-pressure leaching step S12.

<3-1. Ore Separation Step>

In the ore separation step S11, the nickel oxide ore serving as raw material is separated into a limonite-type ore and a saprolite-type ore on the basis of the magnesium grade. Of the nickel oxide ore serving as raw material, the limonite-type ore has a high iron grade but a low grade of magnesium that is an alkaline component. On the other hand, the saprolite-type ore is an ore having a high magnesium grade, which contains a large amount of alkaline component such as magnesium or silica. Incidentally, as the classification, "limonite-type ore<magnesium grade: 1.3% by weight<saprolite-type ore" is known.

Specifically, in the ore separation step S11, by using a magnesium grade of 2% by weight as the boundary, the nickel oxide ore is separated into a limonite-type ore having a low magnesium grade in which the iron grade is high and the grade of magnesium that is an alkaline component is 2% by weight or less and a saprolite-type ore having a high magnesium grade which contains a large amount of alkaline component such as magnesium or silica, that is, in which the magnesium grade is more than 2% by weight.

In this way, by separating the nickel oxide ore serving as raw material on the basis of the grade of magnesium that is an alkaline component, only the separated saprolite ore having a high magnesium grade is provided to the normal-pressure leaching treatment in the normal-pressure leaching step S12 described later. According to this, the smelting which also effectively utilizes the saprolite ore can be carried out, and a decrease in the amount of the ore provided to the normal-pressure leaching enables the normal-pressure leaching treatment to be performed in a short time.

<3-2. Normal-Pressure Leaching Step>

(Regarding Normal-Pressure Leaching Step)

In the normal-pressure leaching step S12, the normal-pressure leaching treatment is carried out on the saprolite-type ore separated in the ore separation step S11. The normal-pressure leaching in the normal-pressure leaching step S12 is performed by adding the pressure leachate obtained by the pressure leaching step S13 described later.

More specifically, in the normal-pressure leaching treatment, it is characterized in that the normal-pressure leaching is performed by adding a pressure leachate in which the concentration of sulfuric acid is adjusted such that the value ([$Fe_2(SO_4)_3$+sulfuric acid]/ore Mg equivalent), which is obtained by dividing the total value of the concentration of the free acid contained in the pressure leachate and the concentration of iron ions calculated on the assumption that the existence form is trivalent by the grade of magnesium contained in the saprolite-type ore, becomes 1.5 mol/mol equivalent or less.

In this way, in the normal-pressure leaching step S12, the blending ratio of the pressure leachate and the saprolite-type ore used in the leaching treatment is determined by the quantity standardized by the molar ratio of the amount of acid contained in the pressure leachate with respect to the amount of magnesium contained in the ore. Further, the leachate obtained in the pressure leaching step S13 described later contains iron ions derived from iron contained in the ore (for example, being contained in the form of iron sulfate ($Fe_2(SO_4)_3$)), and the iron ions become a hydroxide in accordance with the increase in pH of the solution so that the iron ions apparently act as an acid to consume the $Mg(OH)_2$ contained in the saprolite ore slurry. Incidentally, hereinafter, an example of the reaction formula of leaching the magnesium contained in the saprolite ore is described.

$$MgO + H_2O \Rightarrow Mg(OH)_2$$

$$H_2SO_4 + Mg(OH)_2 \Rightarrow MgSO_4 + 2H_2O$$

$$Fe_2(SO_4)_3 + 3MgO + 3H_2O \Rightarrow 3MgSO_4 + 2Fe(OH)_3$$

According to this, the leaching of magnesium from the saprolite ore by the normal-pressure leaching is promoted and the magnesium grade in the normal-pressure leaching residue to be formed can be decreased in a short time. That is, it is possible to obtain a normal-pressure leaching residue having a desired magnesium grade.

Furthermore, in the normal-pressure leaching step S12, the leaching of magnesium from the saprolite ore can be further promoted, as necessary, by additionally adding sulfuric acid, and the solid-liquid ratio in the normal-pressure leaching can be increased.

(Regarding Solid-Liquid Separation Step)

After the normal-pressure leaching treatment is carried out on the saprolite ore in the normal-pressure leaching step S12, a solid-liquid separation treatment to solid-liquid separate the obtained normal-pressure leaching slurry into a normal-pressure leachate and a normal-pressure leaching residue is carried out (a solid-liquid separation step S14). The solid-liquid separation treatment method in the solid-liquid separation step S14 is not particularly limited, but for example, the solid-liquid separation treatment can be performed using a solid-liquid separation device such as a thickener.

<3-3. Pressure Leaching Step>
(Regarding Pressure Leaching Step)

In the pressure leaching step S13, the slurry of the limonite-type ore having a low magnesium grade separated in the ore separation step S11 and the slurry of the normal-pressure leaching residue obtained by the normal-pressure leaching treatment in the normal-pressure leaching step S12 are mixed with each other, sulfuric acid is added thereto, and then pressure leaching is carried out under high temperature and high pressure.

This pressure leaching step S13 corresponds to the leaching step (pressure leaching step) S1 of the wet smelting method illustrated in the process diagram of FIG. 1, and the limonite-type ore and the normal-pressure leaching residue obtained by the normal-pressure leaching treatment are loaded as targets to be treated into a pressurized reaction tank such as an autoclave and then subjected to the pressure leaching treatment using sulfuric acid. Incidentally, a detailed description of the leaching treatment is not provided herein since the leaching treatment is similar to the leaching step S1.

Herein, in the present embodiment, as the target of the pressure leaching treatment in this pressure leaching step S13, the saprolite ore having a high magnesium grade is not directly used, but as described above, the normal-pressure leaching residue, which is obtained by carrying out the normal-pressure leaching treatment (the normal-pressure leaching step S12) only on the saprolite ore and has a magnesium grade reduced to a desired grade, is mixed with the limonite ore having a low magnesium grade and then used. According to this, in this pressure leaching step S13, the sulfuric acid added for leaching is not consumed by the magnesium that is an alkaline component. Therefore, even when the amount of sulfuric acid is not set to be excessive (with a lower amount of free sulfuric acid), valuable metals such as nickel and cobalt can be efficiently leached.

(Regarding Solid-Liquid Separation Step)

After the pressure leaching treatment is carried out on the mixture of the limonite ore and the normal-pressure leaching residue in the pressure leaching step S13, a solid-liquid separation treatment to solid-liquid separate the obtained leached slurry (the pressure leaching slurry) into a leachate (a pressure leachate) and a leaching residue (a pressure leaching residue) is carried out (a solid-liquid separation step S15). The solid-liquid separation treatment method in the solid-liquid separation step S15 is not particularly limited, but for example, the solid-liquid separation treatment can be performed using a solid-liquid separation device such as a thickener.

The pressure leachate separated by the solid-liquid separation treatment is transferred to the normal-pressure leaching step S12 in which the normal-pressure leaching treatment is carried out on the saprolite ore having a high magnesium grade as described above, and is used in the normal-pressure leaching treatment. In this way, by directly subjecting the pressure leaching slurry obtained through the pressure leaching step S13 to the solid-liquid separation in the solid-liquid separation step S15, a leachate having a high concentration of free acid can be obtained and the solid-liquid ratio in the normal-pressure leaching in the normal-pressure leaching step S12 can be increased.

<3-4. Regarding Subsequent Step>
(Regarding Neutralization Step)

As illustrated in the process diagram of FIG. 2, the normal-pressure leachate obtained by the normal-pressure leaching (the normal-pressure leaching treatment using the pressure leachate) of the saprolite ore in the normal-pressure leaching step S12 is transferred to a neutralization step S16 and then the neutralization treatment is carried out. Incidentally, in the neutralization treatment in the neutralization step S16, the leaching residue obtained by the pressure leaching in the pressure leaching step S13 can be treated, for example, together with the rinsing liquid recovered by countercurrent multi-stage washing (the residue cleaning step S17).

This neutralization step S16 corresponds to the neutralization step S3 of the wet smelting method illustrated in the process diagram of FIG. 1, and the pH is adjusted by adding a neutralizer such as calcium carbonate to the normal-pressure leachate (and the rinsing liquid) to generate the neutralized precipitate (the neutralized residue) containing impurity elements and the post-neutralization solution serving as a mother liquor for recovering nickel. Incidentally, a detailed description of the neutralization treatment is not provided herein since the neutralization treatment is similar to the neutralization step S3.

(Regarding Sulfuration Step)

The post-neutralization solution (the mother liquor) obtained by the neutralization treatment in the neutralization step S16 is transferred to a sulfuration step S18 and then subjected to the sulfuration treatment.

This sulfuration step S18 corresponds to the sulfuration step S4 of the wet smelting method illustrated in the process diagram of FIG. 1, and a sulfurizing agent such as a hydrogen sulfide gas is blown into the post-neutralization solution serving as a mother liquor for recovering nickel to cause a sulfuration reaction to occur, thereby obtaining a mixed sulfide containing nickel and cobalt with less impurity components (a nickel•cobalt mixed sulfide) and a barren solution (a post-sulfurization solution) having a stable nickel concentration at a low level. Incidentally, a detailed description of the sulfuration treatment is not provided herein since the sulfuration treatment is similar to the sulfuration step S4.

(Final Neutralization Step)

The barren solution obtained by the sulfuration treatment in the sulfuration step S18 and the leaching residue (the pressure leaching residue) washed in multiple stages in the residue cleaning step S17 are transferred to a final neutralization step S19 and then subjected to a neutralization treatment (a detoxification treatment) to adjust the pH to a predetermined pH range satisfying the discharge standard.

This final neutralization step S19 corresponds to the final neutralization step S5 of the wet smelting method illustrated as the process diagram in FIG. 1, and for example, according to the neutralization treatment using a neutralizer such as calcium carbonate or calcium hydroxide, heavy metal ions contained in the barren solution or the pressure leaching residue are subjected to the neutralization treatment. Incidentally, the final neutralized precipitate slurry in which heavy metal is removed from the aqueous solution is transferred to a tailings dam.

EXAMPLES

Hereinafter, the present invention will be described in more detail by means of Examples, but the present invention is not limited to the following Examples at all.

Examples 1 to 4

A sulfuric acid solution having a sulfuric acid concentration presented in the following Table 1 or an HPAL leachate (a pressure leachate generated by pressure leaching) having an iron concentration and a sulfuric acid concentration presented in the following Table 1 were put into a baffled separable flask having a capacity of 1000 mL, and the resultant product was heated to 90° C. using an oil bath.

Figure 3:
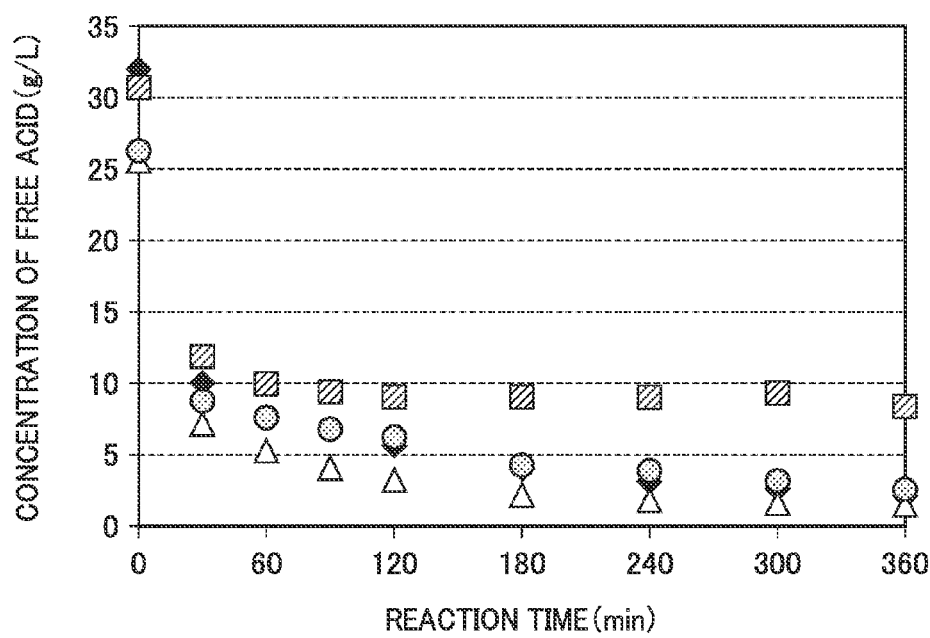
FIG. 3 is a graph showing the concentration of free acid as a function of reaction time in a normal-pressure leaching treatment of Examples 1 to 4.

Next, the low grade nickel oxide ore having a predetermined magnesium grade was added to have a predetermined [$Fe_2(SO_4)_3$+sulfuric acid]/ore Mg equivalent (mol/mol) presented in the following Table 1, and then the normal-pressure leaching treatment was carried out over 6 hours while stirring at a stirring speed of 700 rpm. 15 mL of each was sampled when 0.5, 1, 1.5, 2, 3, 4, 5, and 6 hours had elapsed from the start of the reaction, a filtration treatment was carried out, and then measurement of the concentration of free acid in the filtrate and various chemical analyses were carried out. The measurement results of the concentrations of free acid at each reaction time are collectively presented in the following Table 2 and graphs of the concentration of free acid and the results of various chemical analyses are shown in FIGS. 3 to 5.

slightly higher than that of Example 3; however, when compared with the difference in the concentrations of free acid between Example 1 and Example 2, the difference in the concentration of free acid between Example 3 and Example 4 was as small as about 1 g/L. Thus, it can be said that the concentrations of free acid are almost in the same range.

Figure 4:
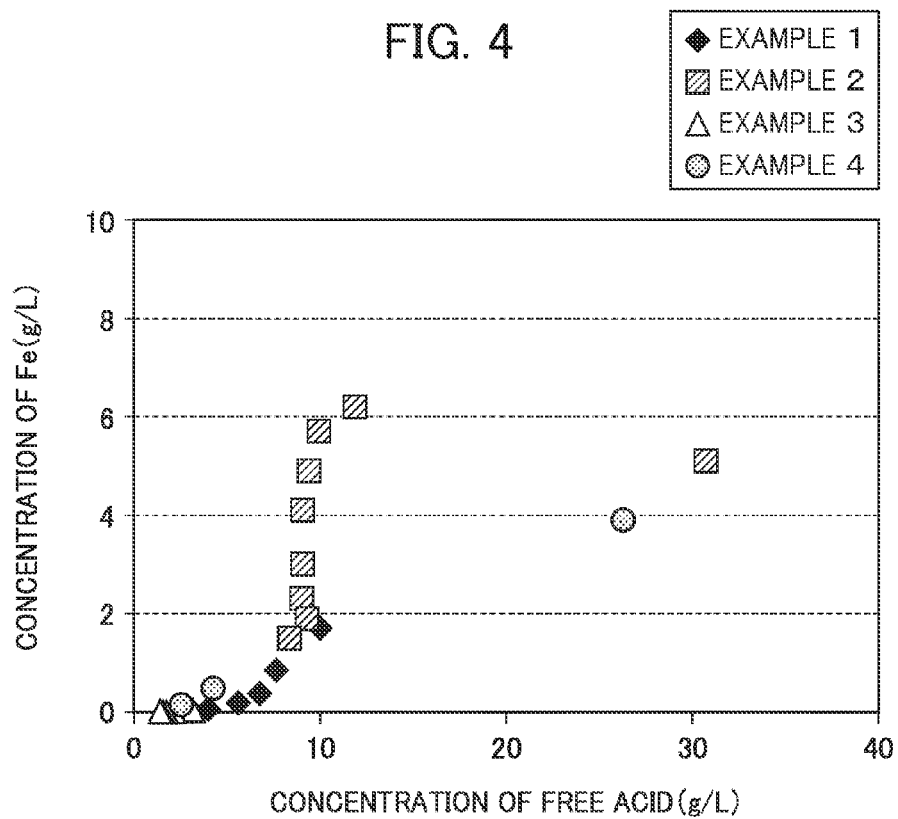
FIG. 4 is a graph showing the concentration of iron as a function of the concentration of free acid in the normal-pressure leaching treatment of Examples 1 to 4.

Further, FIG. 4 is a graph showing the concentration of iron as a function of the concentration of free acid. From FIG. 4, it was found that in Example 2, the iron concentration was also decreased near a point in which the concentration of free acid was 12 g/L or less.

Figure 5:
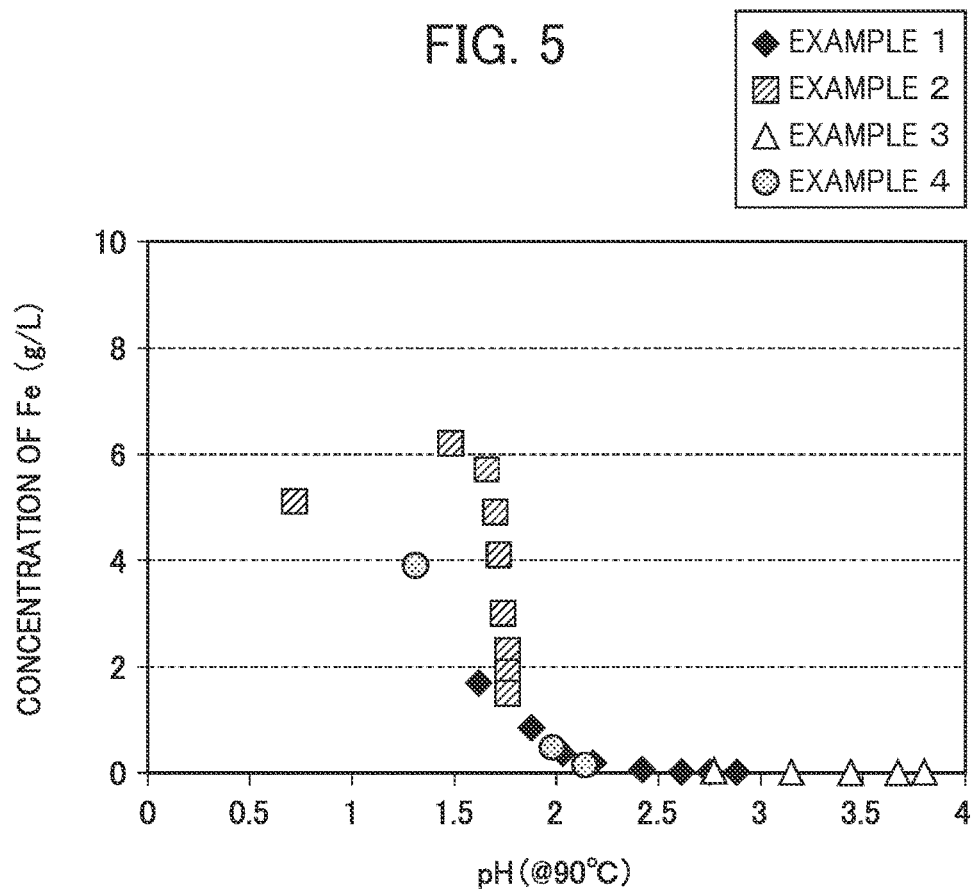
FIG. 5 is a graph showing the concentration of iron as a function of the pH of the solution in the normal-pressure leaching treatment of Examples 1 to 4.

Further, FIG. 5 is a graph showing the concentration of iron as a function of the pH of a solution subjected to the leaching treatment. From the result shown in the graph of FIG. 5, for example, the decrease in the iron concentration in Example 2 is considered to be caused by hydroxide precipitation of trivalent iron ions ($Fe^{3+}$).

TABLE 1

| | Solution | Concentration of sulfuric acid (g/L) | Material amount (g) | Liquid amount (mL) | Solid/liquid (%) | Concentration of Fe (g/L) | [$Fe_2(SO_4)_3$ + Sulfuric acid]/Ore Mg equivalent (mol/mol) | | |
|---|---|---|---|---|---|---|---|---|---|
| | | | | | | | Only sulfuric acid | No Fe | Consideration of Fe |
| Example 1 | Sulfuric acid solution | 32 | 183.8 | 860 | 18.4 | — | 0.86 | — | — |
| Example 2 | Pressure leachate | 31 | 181.2 | 838 | 17.8 | 5.1 | — | 0.86 | 1.18 |
| Example 3 | Sulfuric acid solution | 26 | 201.9 | 875 | 18.7 | — | 0.76 | — | — |
| Example 4 | Pressure leachate | 26 | 260.0 | 828 | 23.9 | 3.9 | — | 0.58 | 0.76 |

TABLE 2

| | Concentration of free acid(g/L) | | | |
|---|---|---|---|---|
| Reaction time | Example 1 | Example 2 | Example 3 | Example 4 |
| 0 | 32.0 | 30.7 | 25.6 | 26.2 |
| 30 | 10.0 | 11.9 | 7.1 | 8.8 |
| 60 | 7.6 | 9.9 | 5.2 | 7.6 |
| 90 | 6.8 | 9.4 | 4.1 | 6.8 |
| 120 | 5.6 | 9.0 | 3.2 | 6.2 |
| 180 | 4.0 | 9.0 | 2.2 | 4.3 |
| 240 | 3.1 | 9.0 | 1.8 | 3.9 |
| 300 | 2.6 | 9.3 | 1.6 | 3.2 |
| 360 | 2.1 | 8.4 | 1.4 | 2.5 |

Example 1 and Example 2 are examples in which the sulfuric acid/ore Mg equivalent ratios (mol/mol) (no consideration of Fe) are set to the same level. However, as shown in Table 2 and FIG. 3, after 6 hours (360 minutes) had elapsed from the start of the reaction, the concentration of free acid in the post-normal-pressure leaching treatment solution was decreased to 2.1 g/L in Example 1, whereas the concentration of free acid in the post-normal-pressure leaching treatment solution was decreased only to 8.4 g/L in Example 2 using the pressure leachate. Incidentally, FIG. 3 is a graph showing the concentration of free acid as a function of reaction time.

Meanwhile, Example 3 and Example 4 are examples in which when iron is calculated as acid, the (iron+acid)/ore Mg equivalent ratios (mol/mol) are set to the same level. As shown in Table 2 and FIG. 3, after the elapse of each reaction time, the concentration of free acid in the post-normal-pressure leaching treatment solution of Example 4 was From the above results of Examples 1 to 4, since iron ions in the pressure leachate form a hydroxide and then precipitate when the neutralization of the free acid advances to increase the pH, it is considered that the iron ions apparently act as an acid to consume $Mg(OH)_2$. From this point, it is found that the amount of acid necessary for the normal-pressure leaching (the amount of the pressure leachate) needs to be determined by calculating the iron ion concentration as an acid.

Examples 5 to 10

An HPAL leachate (a pressure leachate) having an iron concentration and a free sulfuric acid concentration presented in the following Table 3 was put into a 500-mL baffled separable flask and then heated to 90° C. using an oil bath.

Next, a low grade nickel oxide ore having a predetermined magnesium grade was added to have a predetermined [$Fe_2(SO_4)_3$+sulfuric acid]/ore Mg equivalent (mol/mol) presented in the following Table 3, and then the normal-pressure leaching treatment was carried out while the mixture was stirred for 3 hours at a stirring speed of 700 rpm. 15 mL of each was sampled when 1, 2, and 3 hours had elapsed from the start of the reaction, a filtration treatment was carried out, and then the concentration of free acid in the filtrate was measured. In addition, the chemical analysis was carried out on the normal-pressure leaching residue obtained by sampling, and the magnesium grade thereof was confirmed. The measurement results are presented in FIGS. 6 and 7.

TABLE 3

|  | Starting liquid | | | Ore | | [Fe$_2$(SO$_4$)$_3$ + Sulfuric acid]/Ore |
| --- | --- | --- | --- | --- | --- | --- |
|  | Liquid amount (mL) | Concentration of Fe (g/L) | H$_2$SO$_4$ (g/L) | Material amount (g) | Mg grade (wt %) | Mg equivalent (mol/mol) |
| Example 5 | 400 | 3.5 | 28 | 99 | 4.5 | 0.82 |
| Example 6 | 400 | 3.6 | 28 | 91 | 3.9 | 1.04 |
| Example 7 | 400 | 3.4 | 42 | 99 | 4.5 | 1.15 |
| Example 8 | 400 | 3.4 | 42 | 91 | 4.5 | 1.25 |
| Example 9 | 400 | 3.0 | 46 | 107 | 3.7 | 1.35 |
| Example 10 | 400 | 3.0 | 49 | 107 | 3.7 | 1.44 |

Figure 6:
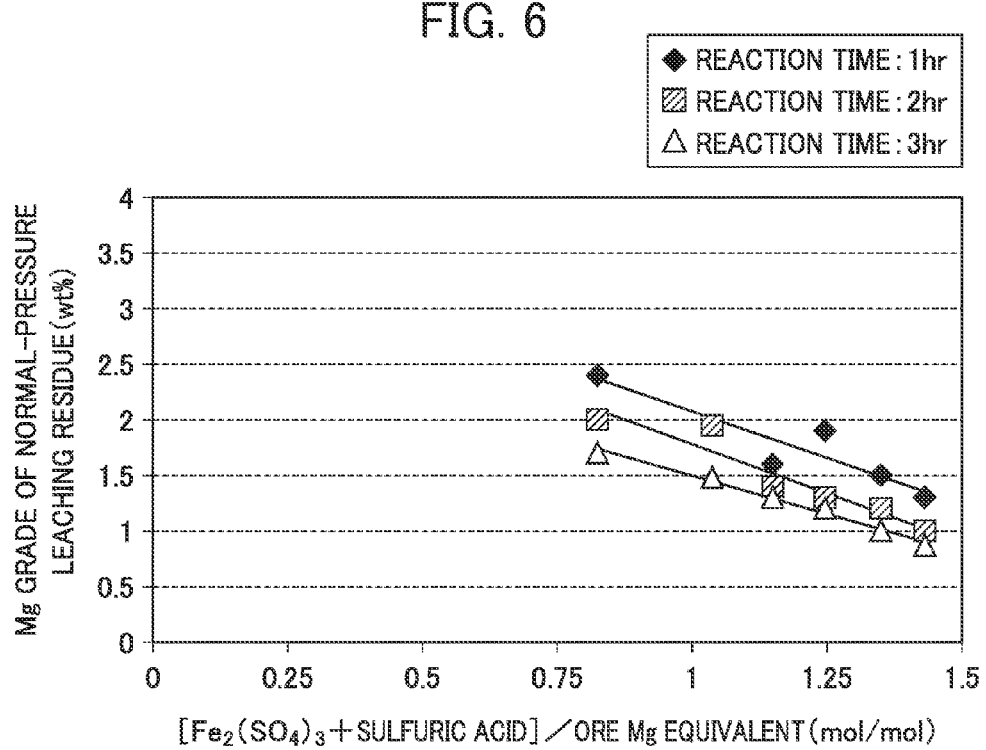
FIG. 6 is a graph showing the grade of magnesium in the leaching residue as a function of [$Fe_2(SO_4)_3$+sulfuric acid]/ore Mg equivalent in the normal-pressure leaching treatment of Examples 5 to 10.

FIG. 6 is a graph showing the grade of magnesium in a leaching residue generated by the normal-pressure leaching as a function of [Fe$_2$(SO$_4$)$_3$+sulfuric acid]/ore Mg equivalent. From FIG. 6, it is possible to confirm the amount of acid and the reaction time which are necessary for obtaining a normal-pressure leaching residue having a target magnesium grade by the normal-pressure leaching from the ore having a high magnesium grade.

Figure 7:
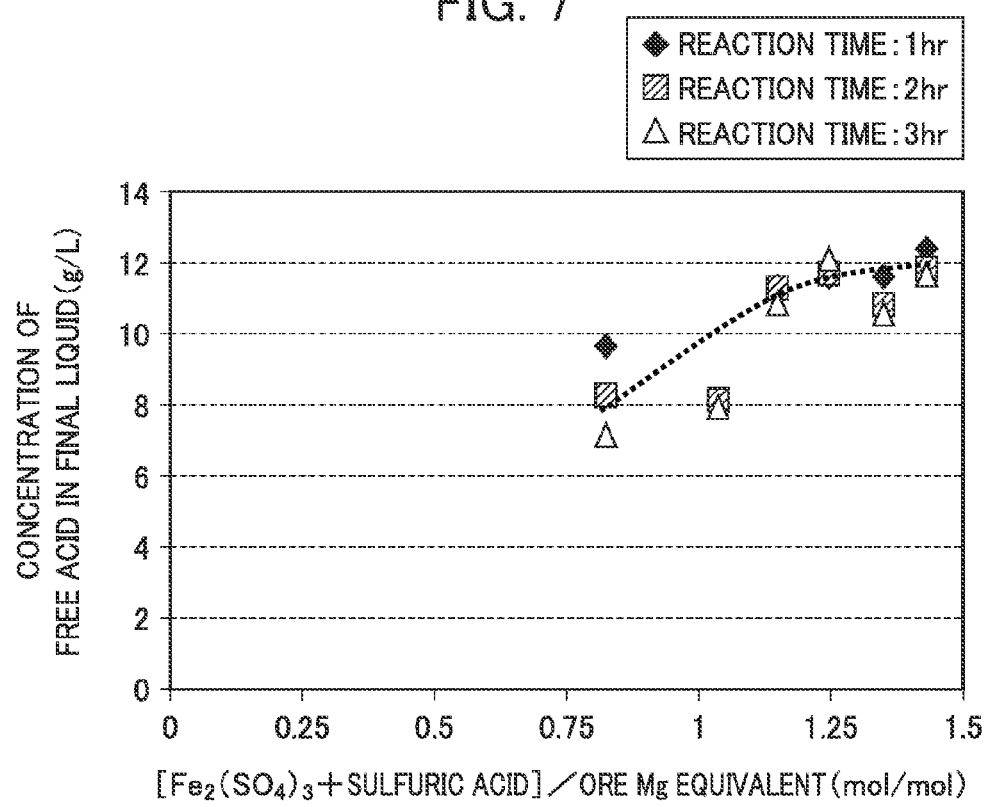
FIG. 7 is a graph showing the concentration of the free acid in the post-reaction solution as a function of [$Fe_2(SO_4)_3$+sulfuric acid]/ore Mg equivalent in the normal-pressure leaching treatment of Examples 5 to 10.

Further, FIG. 7 is a graph showing the concentration of free acid in a post-reaction solution as a function of [Fe$_2$(SO$_4$)$_3$+sulfuric acid]/ore Mg equivalent. From FIG. 7, it is found that in order to suppress the concentration of free acid in the post-normal-pressure leaching solution to be low when the reaction time for the normal-pressure leaching treatment is set to 3 hours or shorter, the [Fe$_2$(SO$_4$)$_3$+sulfuric acid]/ore Mg equivalent is desirably adjusted to 1.5 (mol/mol) or less.

From the results of Examples 1 to 10, it was found that by standardizing the condition of the normal-pressure leaching treatment as [Fe$_2$(SO$_4$)$_3$+sulfuric acid]/ore Mg equivalent (mol/mol), the amount of acid and the reaction time, which are necessary for obtaining a normal-pressure leaching residue having a target magnesium grade by the normal-pressure leaching from the ore having a high magnesium grade, can be controlled.

Examples 11 to 13

A leached slurry (35% by weight) composed of a normal-pressure leaching residue having a metal grade presented in the following Table 4 and a normal-pressure leachate (a post-normal-pressure leaching solution) having a concentration presented in the following Table 5 and a low magnesium grade nickel oxide ore (40% by weight slurry:tap water used for dilution) having a metal grade presented in Table 4 were mixed with each other at a material amount (g) and a liquid amount (L) presented in Table 4 and Table 5 and then sulfuric acid and water were added thereto at amounts which are presented in the following Table 6 to prepare each slurry having a concentration of 28% by weight.

TABLE 4

|  | Material amount (g) | Liquid amount (L) | Grade (wt %) | | | | | | | | |
| --- | --- | --- | --- | --- | --- | --- | --- | --- | --- | --- | --- |
|  |  |  | Ni | Co | Fe | Mn | Si | Cr | Mg | Al | S |
| Low Mg ore | 360 | — | 1.1 | 0.07 | 48 | 0.72 | 1.7 | 2.2 | 0.73 | 2.0 | 0.08 |
| Normal-pressure leaching residue | 140 | — | 1.2 | 0.07 | 45 | 0.47 | 5.4 | 1.4 | 1.2 | 1.4 | 0.77 |

TABLE 5

|  | Material amount (g) | Liquid amount (L) | Concentration of leachate (g/L) | | | | | | | | |
| --- | --- | --- | --- | --- | --- | --- | --- | --- | --- | --- | --- |
|  |  |  | Ni | Co | Fe | Mn | Si | Cr | Mg | Al | S |
| Post-normal-pressure leaching solution | — | 0.235 | 4.5 | 0.42 | 0.94 | 3.1 | 0.43 | 0.35 | 11 | 4.0 | 29 |

In each Example, the prepared slurry was put into an autoclave having a capacity of 3 liters and then subjected to pressure leaching at a reaction temperature of 245° C. and a retention time of 1 hour by a batch process.

The leaching residue slurry obtained by the pressure leaching treatment was filtered to separate solid and liquid and then the concentration of free acid in the obtained leachate was measured. In addition, the concentration of each component in the leachate and the grade of each component in the obtained leaching residue were measured by chemical analysis to calculate the leaching rate of each component. The concentration of each component in the obtained leachate (pressure leachate) is presented in the following Table 6 and the leaching rate of each component is presented in the following Table 7.

The leaching residue slurry obtained by the pressure leaching treatment was filtered to separate solid and liquid and then the concentration of free acid in the obtained leachate was measured. In addition, the concentration of each component in the leachate and the grade of each component in the obtained leaching residue were measured by chemical analysis to calculate the leaching rate of each component. The concentration of each component in the obtained leachate (pressure leachate) is presented in the following Table 9 and the leaching rate of each component is presented in the following Table 10.

TABLE 6

| | Amount of sulfuric acid (kg/t-ore) | Concentration of free acid (g/L) | ORP (mV) | Concentration of leachate (g/L) | | | | | | | | |
|---|---|---|---|---|---|---|---|---|---|---|---|---|
| | | | | Ni | Co | Fe | Mn | Si | Cr | Mg | Al | S |
| Example 11 | 215 | 27.6 | 500 | 4.3 | 0.36 | 4.6 | 2.8 | 0.42 | 0.12 | 5.3 | 3.0 | 29 |
| Example 12 | 235 | 30.3 | 494 | 4.5 | 0.36 | 4.8 | 2.8 | 0.36 | 0.15 | 5.2 | 3.6 | 31 |
| Example 13 | 255 | 33.8 | 499 | 5.1 | 0.40 | 5.7 | 3.1 | 0.38 | 0.21 | 5.8 | 4.6 | 37 |

TABLE 7

| | Amount of sulfuric acid (kg/t-ore) | Concentration of free acid (g/L) | ORP (mV) | Leaching rate (%) | | | | | | | |
|---|---|---|---|---|---|---|---|---|---|---|---|
| | | | | Ni | Co | Fe | Mn | Si | Cr | Mg | Al |
| Example 11 | 215 | 27.6 | 500 | 88.8 | 93.1 | 2.6 | 88.9 | 5.3 | 1.9 | 91.1 | 42.2 |
| Example 12 | 235 | 30.3 | 494 | 92.9 | 93.3 | 2.8 | 90.6 | 4.2 | 1.6 | 85.7 | 45.2 |
| Example 13 | 255 | 33.8 | 499 | 95.0 | 93.8 | 3.1 | 92.8 | 4.7 | 3.3 | 92.5 | 59.9 |

From Table 6 and Table 7, it is found that even when the concentration of free acid is low, that is, the amount of sulfuric acid is not set to be excessive, valuable metals can be leached at a high leaching rate. This point can be more clearly understood when compared with the results of Comparative Examples 1 to 3 described below.

Comparative Examples 1 to 3

A nickel oxide ore (saprolite-type ore) having a high magnesium grade with a metal grade presented in the following Table 8 was subjected to pressure leaching by the similar method to Examples 11 to 13 described above at the added amount of sulfuric acid presented in the following Table 9.

TABLE 8

| | Material amount (g) | Liquid amount (L) | Grade (wt %) | | | | | | | | |
|---|---|---|---|---|---|---|---|---|---|---|---|
| | | | Ni | Co | Fe | Mn | Si | Cr | Mg | Al | S |
| High Mg ore | 500 | — | 1.3 | 0.12 | 40 | 0.78 | 5.5 | 2.1 | 3.9 | 1.4 | 0.03 |

TABLE 9

| | Amount of sulfuric acid (kg/t-ore) | Concentration of free acid (g/L) | ORP (mV) | Concentration of leachate (g/L) | | | | | | | |
|---|---|---|---|---|---|---|---|---|---|---|---|
| | | | | Ni | Co | Fe | Mn | Si | Cr | Mg | Al | S |
| Comparative Example 1 | 300 | 25.7 | 508 | 4.0 | 0.37 | 2.0 | 2.3 | 0.28 | 0.03 | 13 | 0.8 | 33 |
| Comparative Example 2 | 350 | 35.0 | 502 | 4.6 | 0.41 | 3.4 | 2.6 | 0.23 | 0.08 | 14 | 1.6 | 39 |
| Comparative Example 3 | 400 | 46.1 | 519 | 5.1 | 0.44 | 3.8 | 2.8 | 0.17 | 0.15 | 14 | 2.7 | 46 |

TABLE 10

| | Amount of sulfuric acid (kg/t-ore) | Concentration of free acid (g/L) | ORP (mV) | Leaching rate (%) | | | | | | | |
|---|---|---|---|---|---|---|---|---|---|---|---|
| | | | | Ni | Co | Fe | Mn | Si | Cr | Mg | Al |
| Comparative Example 1 | 300 | 25.7 | 508 | 79.5 | 86.9 | 1.4 | 81.3 | 1.4 | 0.5 | 94.7 | 16.8 |
| Comparative Example 2 | 350 | 35.0 | 502 | 89.4 | 87.8 | 2.4 | 87.5 | 1.3 | 0.8 | 91.8 | 27.2 |
| Comparative Example 3 | 400 | 46.1 | 519 | 96.1 | 93.6 | 2.5 | 92.1 | 0.9 | 1.4 | 91.8 | 42.9 |

From Table 9 and Table 10, it is found that when the pressure leaching is carried out directly on the high magnesium ore, the leaching rate of nickel and cobalt cannot be maintained high, and it is found that in order to recover valuable metals at a high leaching rate, the concentration of free acid needs to be increased by increasing the added amount of sulfuric acid. Incidentally, more specifically, based on the results of Comparative Examples 1 to 3, it is found that the nickel leaching rate becomes 95% or more only when the concentration of free acid reaches about 46.1 g/L (Comparative Example 3).

Figure 8:
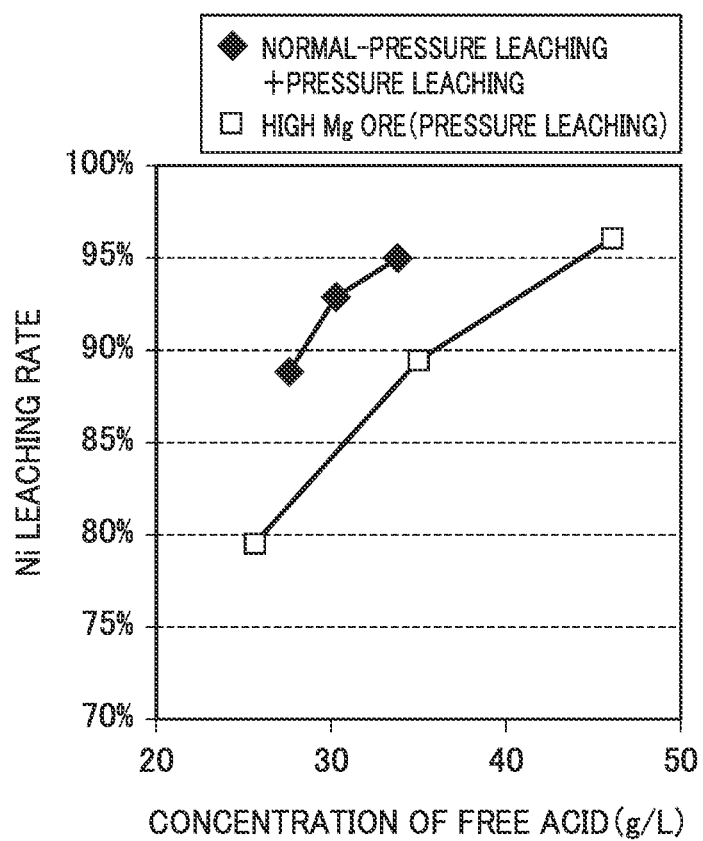
FIG. 8 is a graph showing the relationship between the concentration of the free acid in the pressure leaching treatment of Examples 11 to 13 and Comparative Examples 1 to 3 and the nickel leaching rate.

FIG. 8 is a graph showing a relationship between the concentration of free acid in Examples 11 to 13 and Comparative Examples 1 to 3 and the nickel leaching rate. As shown in FIG. 8, according to the method carried out in Examples 11 to 13, it is found that valuable metals can be efficiently recovered with a high recovery rate.

The invention claimed is:

1. A wet smelting method for nickel oxide ore by which valuable metals are recovered from the nickel oxide ore, the method comprising:
    a step A of separating the nickel oxide ore into a limonite ore having a low magnesium grade with a magnesium grade of 2% by weight or less and a saprolite ore having a high magnesium grade with a magnesium grade of more than 2% by weight;
    a step B of normal-pressure leaching the saprolite ore obtained in the step A by adding a pressure leachate which is obtained by pressure leaching in a step C described below and in which the concentration of sulfuric acid is adjusted such that the value, which is obtained by dividing the total value of the concentration of free acid contained in the pressure leachate and the concentration of iron ions calculated on the assumption that the existence form is trivalent by the grade of magnesium contained in the saprolite ore, becomes 1.5 mol/mol equivalent or less, to obtain a normal-pressure leachate and a normal-pressure leaching residue; and
    a step C of performing pressure leaching by mixing the limonite ore obtained in the step A and the normal-pressure leaching residue obtained in the step B and then reacting the resultant mixture with sulfuric acid in an acidic atmosphere under high temperature and high pressure, to obtain a pressure leachate.

* * * * *